(12) United States Patent
Im

(10) Patent No.: US 12,179,615 B2
(45) Date of Patent: Dec. 31, 2024

(54) APPARATUS FOR PROVIDING UPDATE, SYSTEM HAVING THE SAME AND METHOD THEREOF

(71) Applicants: Hyundai Motor Company, Seoul (KR); Kia Corporation, Seoul (KR)

(72) Inventor: Keyng Bin Im, Chungcheongnam-Do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 382 days.

(21) Appl. No.: 17/706,136

(22) Filed: Mar. 28, 2022

(65) Prior Publication Data

US 2023/0022655 A1 Jan. 26, 2023

(30) Foreign Application Priority Data

Jul. 22, 2021 (KR) .................. 10-2021-0096661

(51) Int. Cl.
*B60L 50/60* (2019.01)
*B60L 50/64* (2019.01)
*B60L 58/13* (2019.01)
*G06F 8/65* (2018.01)

(52) U.S. Cl.
CPC .............. *B60L 50/66* (2019.02); *B60L 50/64* (2019.02); *B60L 58/13* (2019.02); *G06F 8/65* (2013.01); *B60L 2270/40* (2013.01)

(58) Field of Classification Search
CPC .......... B60L 50/66; B60L 50/64; B60L 58/13; B60L 2270/40; G06F 8/65
See application file for complete search history.

(56) References Cited

U.S. PATENT DOCUMENTS

| | | | |
|---|---|---|---|
| 10,279,757 B2 | 5/2019 | Netter | |
| 10,678,350 B2* | 6/2020 | Kamiyama | ......... G06F 3/03545 |
| 10,915,310 B2* | 2/2021 | Seki | ......... B60R 16/02 |
| 10,990,379 B2 | 4/2021 | Miura | |
| 2016/0373913 A1 | 12/2016 | Schwarz et al. | |
| 2018/0272964 A1 | 9/2018 | Netter | |
| 2020/0065087 A1 | 2/2020 | Miura | |
| 2021/0232382 A1 | 7/2021 | Miura | |
| 2022/0063585 A1* | 3/2022 | Tabata | ......... B60L 58/20 |

FOREIGN PATENT DOCUMENTS

| | | |
|---|---|---|
| EP | 3368379 B | 10/2016 |
| JP | 2020-030607 A | 2/2020 |
| KR | 10-2017-0068806 A | 6/2017 |
| KR | 10-2020-0027777 A | 3/2020 |

* cited by examiner

*Primary Examiner* — Huan Le
(74) *Attorney, Agent, or Firm* — Morgan, Lewis & Bockius LLP

(57) ABSTRACT

An update control apparatus of a vehicle to which a dual-power supply is applied, includes: a communication device configured to obtain update software for an update target controller from a server; a processor configured to determine whether to perform updating of a vehicle using the obtained update software by determining statuses of an auxiliary battery and a main battery of the vehicle; and a storage configured to store data and algorithms driven by the processor.

18 Claims, 3 Drawing Sheets

APPARATUS FOR PROVIDING UPDATE, SYSTEM HAVING THE SAME AND METHOD THEREOF

CROSS-REFERENCE TO RELATED APPLICATION

The present application claims priority to Korean Patent Application No. 10-2021-0096661, filed on Jul. 22, 2021, the entire contents of which is incorporated herein for all purposes by this reference.

BACKGROUND OF THE INVENTION

Field of the Invention

The present invention relates to an update control apparatus, a system including the same, and a method thereof, and more particularly, to a technique for determining an update entry depending on a dual power supply state.

Description of Related Art

With development of vehicle industry, development of a system to provide various services using a wireless communication technique is continuously being made to provide convenience to a driver. For example, a vehicle may update software of a controller mounted on the vehicle through wireless communication (over the air (OTA)). Since the update of the controller cannot be performed while driving, it may be performed while the vehicle is parked. Power is required for updating the controller, and the power may be supplied by a battery mounted in the vehicle. Accordingly, it is necessary to secure a sufficient remaining battery capacity to update the controller.

Since only one battery is provided in a single-powered vehicle, it was determined whether to perform wireless update entry in consideration of a charge amount of a main battery. Recently, as a number of dual-powered vehicles has increased, a technique for determining wireless update entry of the dual-powered vehicles is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an update control apparatus, a system including the same, and a method thereof, configured for determining statuses of an auxiliary battery and a main battery to determine whether an update of a controller of a vehicle including a dual-power supply when updating it.

The technical objects of the present invention are not limited to the objects mentioned above, and other technical objects not mentioned may be clearly understood by those skilled in the art from the description of the claims.

Various aspects of the present invention are directed to providing an update control apparatus of a vehicle to which a dual-power supply is applied, including: a communication device configured to obtain update software for an update target controller from a server; a processor configured to determine whether to perform updating of a vehicle using the acquired software by determining statuses of an auxiliary battery and a main battery of the vehicle; and a storage configured to store data and algorithms driven by the processor.

In various exemplary embodiments of the present invention, the processor may include determining at least one of a communication state, a temperature, a voltage, or a state of charge (SOC) value of the auxiliary battery.

In various exemplary embodiments of the present invention, the processor may determine that the auxiliary battery is in an updatable state when the processor concludes that the communication state of the auxiliary battery is normal, the temperature of the auxiliary battery satisfies a predetermined range, the voltage of the auxiliary battery is smaller than a predetermined maximum voltage, and the SOC value of the auxiliary battery exceeds a predetermined usable SOC.

In various exemplary embodiments of the present invention, the processor depending on whether the status of the auxiliary battery satisfies a predetermined condition, may determine a total charge amount by use of a charge amount of the main battery, or may determine the total charge amount by use of the charge amount of the main battery and a charge amount of the auxiliary battery.

In various exemplary embodiments of the present invention, the processor may determine whether to perform the updating of the vehicle by comparing the total charge amount with a discharge amount required for the updating.

In various exemplary embodiments of the present invention, the processor may perform the updating of the vehicle when a value obtained by subtracting the discharge amount required for the updating from the total charge amount is greater than a predetermined SOC reference value of the main battery.

In various exemplary embodiments of the present invention, the processor may determine the statuses of the auxiliary battery and the main battery for updating the vehicle when ignition of the vehicle is turned off.

In various exemplary embodiments of the present invention, the processor may control a use area of the main battery to be varied and used depending on the status of the auxiliary battery.

Various aspects of the present invention are directed to providing a vehicle system including: a first battery; a second battery; and an update control apparatus configured to determine whether to perform updating of a vehicle by determining statuses of the first battery and the second battery.

In various exemplary embodiments of the present invention, the first battery may supply power when starting the vehicle, the second battery may supply power when ignition of is turned off.

In various exemplary embodiments of the present invention, it may further include a battery management device configured to monitor the statuses of the first battery and the second battery to provide information related to the statuses of the first battery and the second battery to the update control apparatus.

In various exemplary embodiments of the present invention, the update control apparatus may include determining at least one of a communication state, a temperature, a voltage, or a state of charge (SOC) value of the second battery.

In various exemplary embodiments of the present invention, the update control apparatus may determine that the second battery is in an updatable state when a communication state of the second battery is normal, the temperature of the second battery satisfies a predetermined range, the voltage of the second battery is smaller than a predetermined maximum voltage, and the SOC value of the second battery exceeds a predetermined usable SOC.

In various exemplary embodiments of the present invention, the update control apparatus depending on whether the status of the second battery satisfies a predetermined condition, may determine a total charge amount by use of a charge amount of the first battery, or may determine the total charge amount by use of the charge amount of the first battery and a charge amount of the second battery.

In various exemplary embodiments of the present invention, the update control apparatus may determine whether to perform the updating of the vehicle by comparing the total charge amount with a discharge amount required for the updating.

In various exemplary embodiments of the present invention, the update control apparatus may perform the updating of the vehicle when a value obtained by subtracting the discharge amount required for the updating from the total charge amount is greater than a predetermined SOC reference value of the first battery.

Various aspects of the present invention are directed to providing an update control method including: obtaining update software for an update target controller from a server; determining whether to perform updating of a vehicle using the obtained update software by determining statuses of an auxiliary battery and a main battery of the vehicle; and performing the updating of the vehicle depending on a result of the determining.

In various exemplary embodiments of the present invention, the performing of the updating of the vehicle may include determining at least one of a communication state, a temperature, a voltage, or a state of charge (SOC) value of the auxiliary battery.

In various exemplary embodiments of the present invention, the performing of the updating of the vehicle may further include determining that the second battery is in an updatable state when a communication state of the second battery is normal, the temperature of the second battery satisfies a predetermined range, the voltage of the second battery is smaller than a predetermined maximum voltage, and the SOC value of the second battery exceeds a predetermined usable SOC.

In various exemplary embodiments of the present invention, the performing of the updating of the vehicle may include: determining a total charge amount by use of a charge amount of the main battery when the status of the auxiliary battery does not satisfy a predetermined condition; determining the total charge amount by use of the charge amount of the main battery and a charge amount of the auxiliary battery when the status of the auxiliary battery satisfies the predetermined condition; and determining whether to perform the updating of the vehicle by comparing the total charge amount with a discharge amount required for the updating.

According to the present technique, it is possible to determine statuses of an auxiliary battery and a main battery to determine whether an update of a controller of a vehicle including a dual-power supply when updating it, performing the update in a stable power situation, and expanding a usable area of the main battery.

Furthermore, various effects which may be directly or indirectly identified through the present specification may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
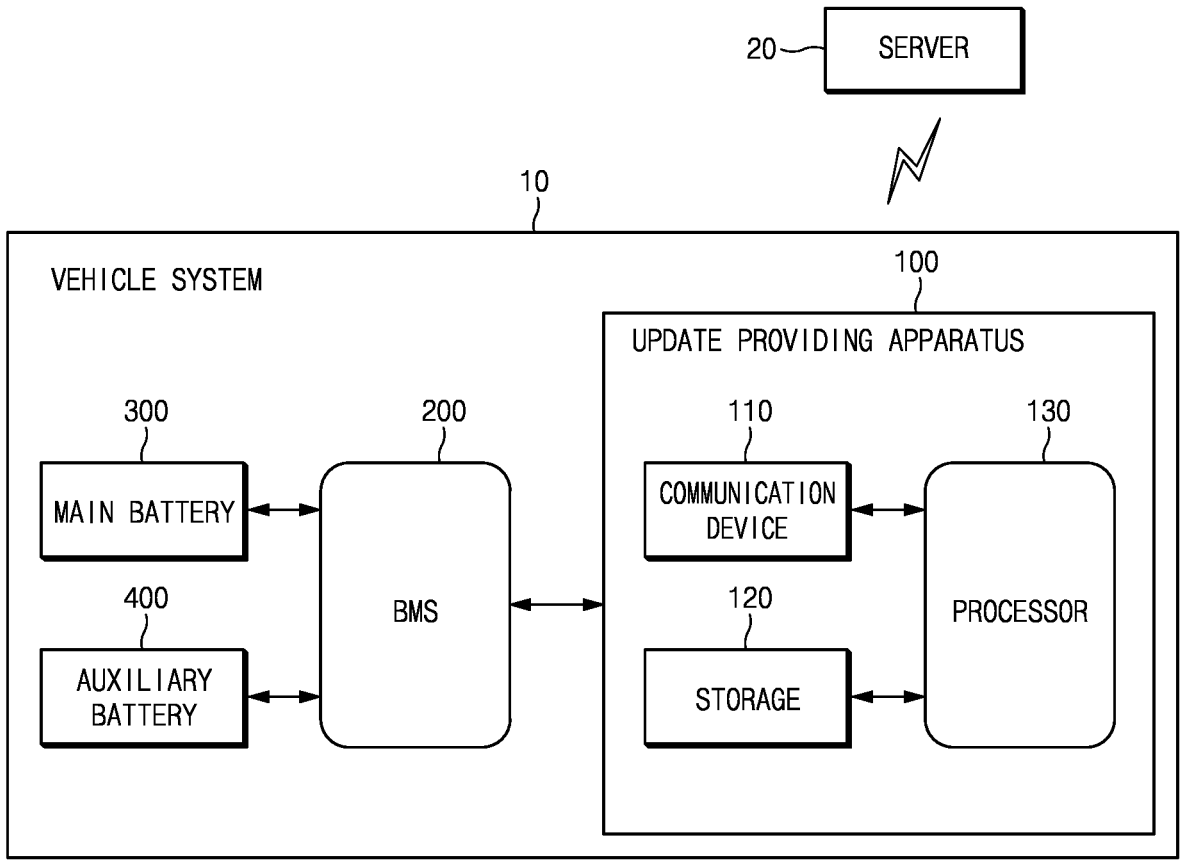
FIG. 1 illustrates a block diagram showing a configuration of a vehicle system including an update control apparatus according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present invention will be described in detail with reference to FIG. 1 to FIG. 3.

FIG. 1 illustrates a block diagram showing a configuration of a vehicle system including an update control apparatus according to various exemplary embodiments of the present invention.

Referring to FIG. 1, software (program) of an in-vehicle controller may be updated through wireless communication between a vehicle system 10 and a server 20. The server 20 may transmit software (program) for updating the in-vehicle controller to the vehicle system 10.

A vehicle system according to various exemplary embodiments of the present invention may include an update control apparatus 100, a battery management device 200, a main battery (first battery) 300, an auxiliary battery (second battery) 400, and an update target controller 500.

The update control apparatus 100 according to the exemplary embodiment of the present invention may be implemented inside the vehicle. In the instant case, the update control apparatus 100 may be integrally formed with internal control units of the vehicle, or may be implemented as a separate device to be connected to control units of the vehicle by a separate connection means.

The update control apparatus 100 may include an integrated central control unit (ICU) for distributing power to the vehicle, and a communication control unit (CCU). Furthermore, the update control apparatus 100 may check whether the update target controller 500 is required, and upon completion of a download of software for an update, may receive an update approval from a driver to transmit an update command to the update target controller 500 after ignition off (IG Off).

The update control apparatus 100 may determine whether to update the vehicle using the acquired software by determining statuses of the auxiliary battery 400 and the main battery 300.

In the instant case, the state of the auxiliary battery may include at least one of a communication state, a temperature, a voltage, or a state of charge (SOC). Furthermore, the status of the main battery may include an SOC value of the main battery, etc.

Referring to FIG. 1, the update control apparatus 100 may include a communication device 110, a storage 120, and a processor 130.

The communication device 110 is a hardware device implemented with various electronic circuits to transmit and receive signals through a wireless or wired connection, and may transmit and receive information based on in-vehicle devices and in-vehicle network communication techniques. As various exemplary embodiments of the present invention, the in-vehicle network communication techniques may include controller area network (CAN) communication, Local Interconnect Network (LIN) communication, flex-ray communication, and the like.

Furthermore, the communication device 110 may perform communication by use of a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, Worldwide Interoperability for Microwave Access (WiMAX), etc. Furthermore, short-range communication technique may include Bluetooth, ZigBee, ultra wideband (UWB), radio frequency identification (RFID), infrared data association (IrDA), and the like. For example, the communication device 110 may perform wireless communication for updating the server 20 and the in-vehicle controllers, and may download software (program) for the updating from the server 20 in an ignition-on state.

The storage 120 may store data and/or algorithms required for the processor 130 to operate, and the like.

As various exemplary embodiments of the present invention, the storage 120 may store information received from the battery management device 200 that manages the statuses of the main battery 300 and the auxiliary battery 400, etc. In the instant case, the information received from the battery management device 200 may include a temperature, a voltage, a SOC, a communication state, and the like of the auxiliary battery 400.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may electrically control each component, and may be an electrical circuit that executes software commands, performing various data processing and determinations described below.

The processor 130 may process a signal transferred between components of the update control apparatus 100, and may perform overall control such that each of the components can perform its function normally.

The processor 130 may be implemented in a form of hardware, software, or a combination of hardware and software, or may be implemented as microprocessor, and may be, e.g., an electronic control unit (ECU), a micro controller unit (MCU), or other subcontrollers mounted in the vehicle.

The processor 130 may determine the statuses of the auxiliary battery 400 and the main battery 300, and may determine whether to update the vehicle by use of the software obtained from the server 20 through the communication device 110.

The processor 130 may determine at least one of a communication state, a temperature, a voltage, or a state of charge (SOC) value of the auxiliary battery 400. That is, the processor 130 may determine whether a communication state of the auxiliary battery 400 is normal, whether a temperature of the auxiliary battery 400 satisfies a predetermined range, whether a voltage of the auxiliary battery 400 is smaller than a predetermined maximum voltage, and whether an SOC value of the auxiliary battery 400 exceeds a predetermined usable SOC.

Accordingly, the processor 130 may determine that the auxiliary battery 400 is in an updatable state when the communication state of the auxiliary battery 400 is normal, the temperature of the auxiliary battery 400 satisfies the predetermined range, the voltage of the auxiliary battery 400 is smaller than the predetermined maximum voltage, and the SOC value of the auxiliary battery 400 exceeds the predetermined usable SOC.

When the status of the auxiliary battery 400 does not satisfy any one of the above-described conditions (temperature, voltage, communication state, and SOC), the processor 130 determines a total charge amount by use of a charge amount of the main battery 300.

On the other hand, when the status of the auxiliary battery 400 satisfies all of the above-described conditions (temperature, voltage, communication state, SOC), the processor 130 may determine the total charge amount by use of both the charge amounts of the main battery 300 and the auxiliary battery 400.

Accordingly, the processor 130 may determine whether to perform the updating of the vehicle by comparing the determined total charge amount and a discharge amount required for the updating. That is, the processor 130 performs the updating when a value obtained by subtracting the discharge amount required for the updating from the total charge amount is greater than a pre-determined SOC reference value of the main battery, and does not perform the updating of the vehicle and re-determines the status of the battery when the value obtained by subtracting the discharge amount required for the updating from the total charge amount is smaller than or equal to the pre-determined SOC reference value of the main battery.

The battery management device 200 may be a battery management system (BMS), and may monitor general statuses of the main battery 300 and the auxiliary battery 400 to provide monitored results to the update control apparatus 100. In the instant case, the monitored results may include status information of the auxiliary battery 400, the temperature of the auxiliary battery 400, the voltage of the auxiliary battery 400, the SOC value of the auxiliary battery 400, the charge amount of the main battery 300, and the like. When the vehicle includes an internal combustion engine, the general statuses of the main battery 300 and the auxiliary battery 400 may be monitored through a battery sensor instead of the battery management device 200, and the update control apparatus 100 may receive and use information related to the general statuses of the main battery 300 and the auxiliary battery 400 from the battery sensor.

The main battery 300 may be a high-voltage battery, and when the vehicle is an electric vehicle, may supply electric power to a motor of the vehicle, and may supply electric power when the vehicle is starting.

The auxiliary battery 400 may be a low-voltage battery that supplies power to an electric load mounted on the vehicle, and may be charged by the main battery 300. In the instant case, since the auxiliary battery 400 has a high charge acceptance and is limited in volume in consideration of fixedness, a lithium battery (NCM series) may be used. However, the lithium battery has a large difference between acceptances of charging and discharging currents depending on a temperature thereof, and thus a temperature requirement may be considered. The lithium battery may also be limited in voltage to prevent problems caused by overcharging.

Accordingly, the vehicle system of such a dual power structure may supply electric power to electrical components of the vehicle through the auxiliary battery 400 during parking to secure a starting performance of the main battery 300.

The update target controller 500 may include at least one controller. The update target controller 500 may include at least one of a navigation device, an audio, video, navigation (AVN) system, or an electronic control unit (ECU).

The update control apparatus 100 in various exemplary embodiments of the present invention may control software update of the update target controller 500, and may download software from the server 20 to update the update target controller 500.

Accordingly, according to various exemplary embodiments of the present invention, it is possible to perform an OTA update in a stable power supply state by determining the status of the auxiliary battery 400 in consideration of a characteristic of the auxiliary battery 300 in a dual-power vehicle and determining whether to perform an OTA update entry depending on the status of the auxiliary battery 400. Furthermore, according to various exemplary embodiments of the present invention, it is possible to secure an OTA updatable charge amount compared to a single power supply by determining an energy range which is available for the OTA update depending on the status of the auxiliary battery 400.

Hereinafter, an update control method according to various exemplary embodiments of the present invention will be described in detail with reference to FIG. 2. FIG. 2 illustrates an update control method according to various exemplary embodiments of the present invention.

Hereinafter, it is assumed that the update control apparatus 100 of the of FIG. 1 performs processes of FIG. 2. Furthermore, in the description of FIG. 2, operations referred to as being performed by a device may be understood as being controlled by the processor 130 of the update control apparatus 100.

A dual-power vehicle may support power during parking by use of the auxiliary battery 400, and may vary a use area of the main battery 300 depending on a power state of the auxiliary battery 400.

Figure 2:
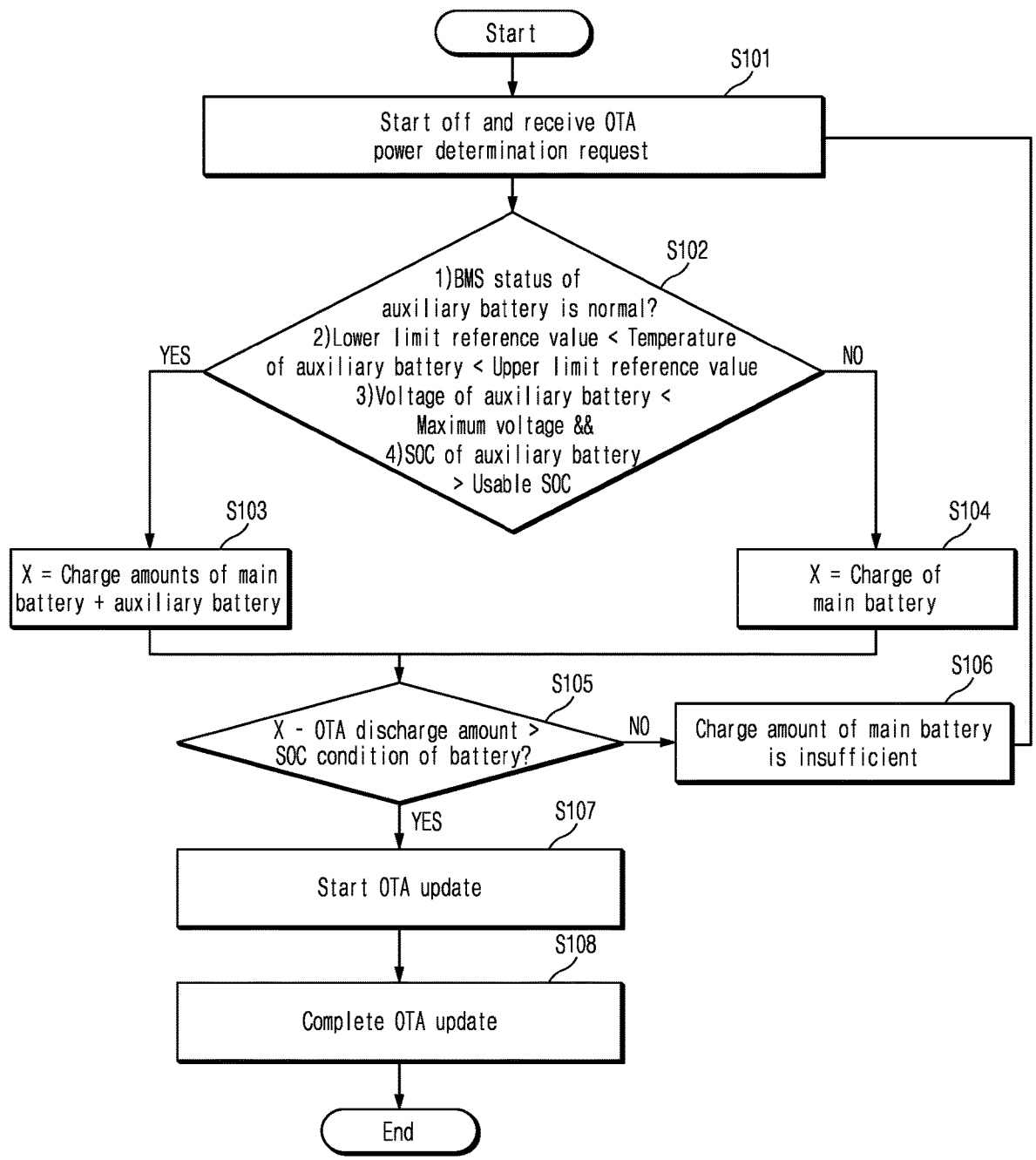
FIG. 2 illustrates an update control method according to various exemplary embodiments of the present invention.

Referring to FIG. 2, when downloading software of the update target controller 500 in an ignition-on state, the update control apparatus 100 checks the power state of the auxiliary battery 400 at an ignition-off time point (S101). In the instant case, in various exemplary embodiments of the present invention, although a CCU and an ICU are implemented as one update control apparatus 100, the CCU may transmit a power determination request to the ICU, the ICU may receive the power determination request, and an operation of FIG. 2 may be seen as being driven by the ICU.

The update control apparatus 100 may determine whether a status of the auxiliary battery 400 is normal, whether a temperature of the auxiliary battery 400 is higher than a predetermined lower limit reference value and lower than an upper limit reference value, whether a voltage of the auxiliary battery 400 is smaller than a predetermined maximum voltage, and an SOC value of the auxiliary battery 400 exceeds a predetermined usable SOC. In the instant case, the status of the auxiliary battery 400 may include a communication state, and it may be determined whether the communication state is normal.

In the instant case, the auxiliary battery 400 may be a lithium battery (NCM series). However, the lithium battery has a large difference between acceptances of charging and discharging currents depending on a temperature thereof, and thus the update control apparatus 100 may determine whether to perform the updating of the vehicle in consideration of a temperature condition of the auxiliary battery 400. Furthermore, the update control apparatus 100 may determine whether to perform the updating of the vehicle in consideration of a voltage condition to prevent overcharging of the auxiliary battery 400.

The update control apparatus 100 determines that the status of the auxiliary battery 400 is sufficient for the updating when the status of the auxiliary battery 400, the temperature of the auxiliary battery 400, the voltage of the auxiliary battery 400, and the SOC condition of the auxiliary battery 400 in step S102 are all satisfied.

Accordingly, the updated control apparatus 100 sets a total charge amount X as a sum of charge amounts of the main battery 300 and the auxiliary battery 400 to determine entry reference of the main battery (S103).

On the other hand, the update control apparatus 100 determines that the status of the auxiliary battery 400 is insufficient for the updating when at least one of the status of the auxiliary battery 400, the temperature of the auxiliary battery 400, the voltage of the auxiliary battery 400, or the SOC condition of the auxiliary battery 400 in step S102 are unsatisfied.

Accordingly, the updated control apparatus 100 sets a total charge amount X as the charge amount of the main battery 300 to determine the entry reference of the main battery (S104). That is, the update control apparatus 100 may determine whether to enter the update in consideration of only the charge amount of the main battery 300 with a restriction on use of the auxiliary battery 400.

The update control apparatus 100 determines whether a value obtained by subtracting an OTA discharge amount (discharge amount required to perform OTA) from the set total charge amount X satisfies a main battery SOC possible condition (S105). In the instant case, the main battery SOC possible condition may be determined in advance by experimental values.

Accordingly, when the value obtained by subtracting the OTA discharge amount from the total charge amount X is greater than the main battery SOC possible condition, the update control apparatus 100 starts an OTA update (S107), and ends it when the OTA update is completed (S108).

On the other hand, when the value obtained by subtracting the OTA discharge amount from the total charge amount X is greater than the main battery SOC possible condition, the update control apparatus 100 determines that the charge amount of the main battery 300 is insufficient for the OTA update (S106), and returns to step S101 and re-determines the status of the auxiliary battery 400 to re-determine whether to perform the OTA update.

Accordingly, according to various exemplary embodiments of the present invention, it is possible to smoothly perform the OTA update by changing the power supply method depending on the statuses of the main battery 300 and the auxiliary battery 400 during the OTA update of a vehicle to which a dual-power supply is applied. Furthermore, according to various exemplary embodiments of the present invention, it is possible to ensure a starting performance even after the OTA update by varying and using a use area of the main battery 300 depending on the status of the auxiliary battery 400.

Figure 3:
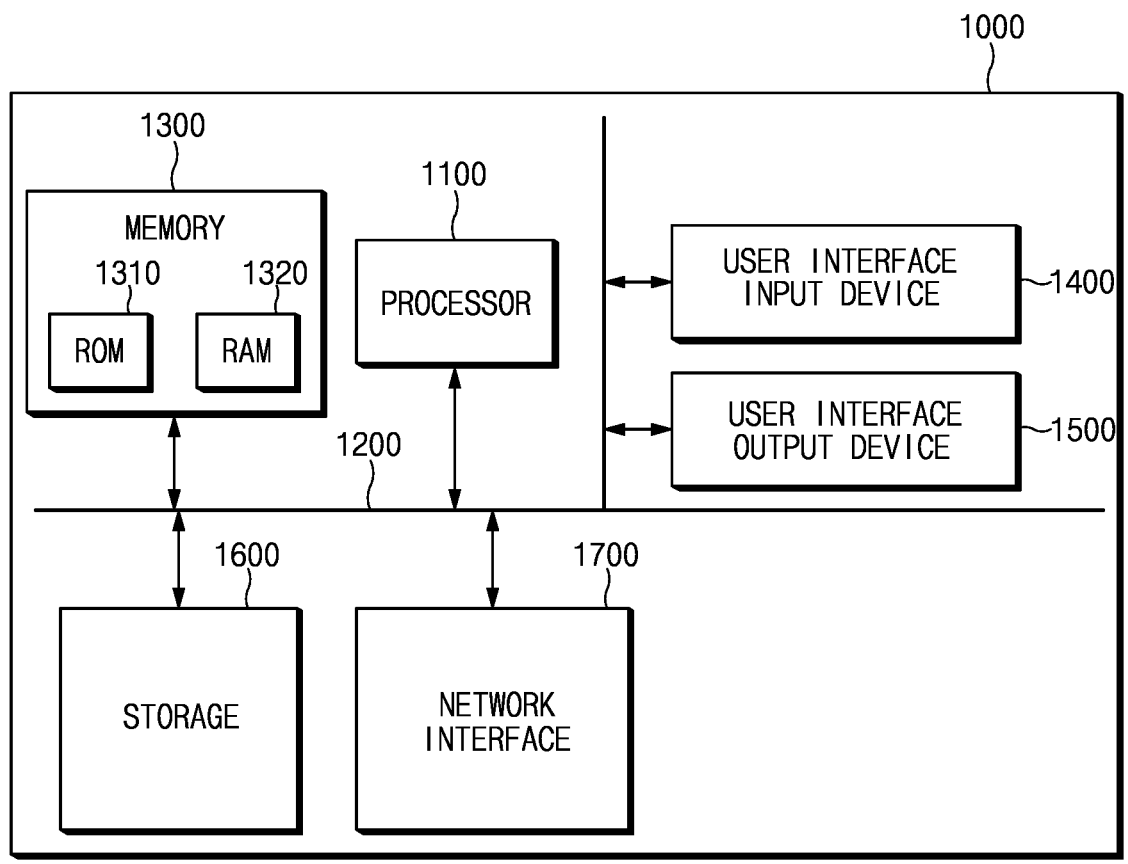
FIG. 3 illustrates a computing system according to various exemplary embodiments of the present invention.

FIG. 3 illustrates a computing system according to various exemplary embodiments of the present invention.

Referring to FIG. 3, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An update control apparatus to which a dual-power supply is applied, the update control apparatus comprising:
 a communication device configured to obtain update software for an update target controller from a server;
 a processor configured to determine whether to perform updating of a vehicle using the obtained update software by determining statuses of an auxiliary battery and a main battery of the vehicle; and
 a storage configured to store data and algorithms driven by the processor,
 wherein the processor is configured to:
  depending on whether the status of the auxiliary battery satisfies a predetermined condition,
  determine a total charge amount by use of a charge amount of the main battery, or determine the total charge amount by use of the charge amount of the main battery and a charge amount of the auxiliary battery.

2. The update control apparatus of claim 1, wherein the processor is configured to determine at least one of a communication state, a temperature, a voltage, or a state of charge (SOC) value of the auxiliary battery.

3. The update control apparatus of claim 2, wherein the processor is configured to determine that the auxiliary battery is in an updatable state when the processor concludes that the communication state of the auxiliary battery is normal, the temperature of the auxiliary battery satisfies a predetermined range, the voltage of the auxiliary battery is smaller than a predetermined maximum voltage, and the SOC value of the auxiliary battery exceeds a predetermined usable SOC.

4. The update control apparatus of claim 1, wherein the processor is configured to determine whether to perform the updating of the vehicle by comparing the total charge amount with a discharge amount required for the updating.

5. The update control apparatus of claim 1, wherein the processor is configured to perform the updating when a value obtained by subtracting a discharge amount required for the updating from the total charge amount is greater than a predetermined SOC reference value of the main battery.

6. The update control apparatus of claim 1, wherein the processor is configured to determine the statuses of the auxiliary battery and the main battery for updating the vehicle when ignition of the vehicle is turned off.

7. The update control apparatus of claim 1, wherein the processor is configured to control a use area of the main battery to be varied and used depending on the status of the auxiliary battery.

8. A vehicle system comprising:
   a first battery;
   a second battery; and
   an update control apparatus configured to determine whether to perform updating of a vehicle by determining statuses of the first battery and the second battery,
   wherein the update control apparatus is configured to:
      depending on whether the status of the second battery satisfies a predetermined condition,
         determine a total charge amount by use of a charge amount of the first battery, or determine the total charge amount by use of the charge amount of the first battery and a charge amount of the second battery.

9. The vehicle system of claim 8,
   wherein the first battery supplies power when starting the vehicle, and
   wherein the second battery supplies power when ignition of the vehicle is turned off.

10. The vehicle system of claim 9, further including:
    a battery management device configured to monitor the statuses of the first battery and the second battery to provide information related to the statuses of the first battery and the second battery to the update control apparatus.

11. The vehicle system of claim 9, wherein the update control apparatus is configured to determine at least one of a communication state, a temperature, a voltage, or a state of charge (SOC) value of the second battery.

12. The vehicle system of claim 11, wherein the update control apparatus is configured to determine that the second battery is in an updatable state when the update control apparatus concludes that the communication state of the second battery is normal, the temperature of the second battery satisfies a predetermined range, the voltage of the second battery is smaller than a predetermined maximum voltage, and the SOC value of the second battery exceeds a predetermined usable SOC.

13. The vehicle system of claim 8, wherein the update control apparatus is configured to determine whether to perform the updating of the vehicle by comparing the total charge amount with a discharge amount required for the updating.

14. The vehicle system of claim 8, wherein the update control apparatus is configured to perform the updating of the vehicle when a value obtained by subtracting a discharge amount required for the updating from the total charge amount is greater than a predetermined SOC reference value of the first battery.

15. An update control method comprising:
    obtaining, by a processor, update software for an update target controller from a server;
    determining, by the processor, whether to perform updating of a vehicle using the obtained update software by determining statuses of an auxiliary battery and a main battery of the vehicle; and
    performing, by the processor, the updating of the vehicle depending on a result of the determining,
    wherein the performing of the updating of the vehicle includes:
        determining a total charge amount by use of a charge amount of the main battery and a charge amount of the auxiliary battery when the status of the auxiliary battery satisfies a predetermined condition; and
        determining whether to perform the updating of the vehicle by comparing the total charge amount with a discharge amount required for the updating.

16. The update control method of claim 15, wherein the performing of the updating of the vehicle includes determining at least one of a communication state, a temperature, a voltage, or a state of charge (SOC) value of the auxiliary battery.

17. The update control method of claim 16, wherein the performing of the updating of the vehicle includes determining that the auxiliary battery is in an updatable state when the processor concludes that the communication state of the auxiliary battery is normal, the temperature of the auxiliary battery satisfies a predetermined range, the voltage of the auxiliary battery is smaller than a predetermined maximum voltage, and the SOC value of the auxiliary battery is smaller than a predetermined usable SOC.

18. The update control method of claim 16, wherein the performing of the updating of the vehicle further includes:
    determining the total charge amount by use of the charge amount of the main battery when the status of the auxiliary battery does not satisfy the predetermined condition.

* * * * *